United States Patent [19]

Glenn

[11] Patent Number: 5,067,817
[45] Date of Patent: Nov. 26, 1991

[54] METHOD AND DEVICE FOR NONCONTACTING SELF-REFERENCING MEASUREMENT OF SURFACE CURVATURE AND PROFILE

[75] Inventor: Paul Glenn, Wellesley, Mass.

[73] Assignee: Bauer Associates, Inc., Wellesley, Mass.

[21] Appl. No.: 476,701

[22] Filed: Feb. 8, 1990

[51] Int. Cl.$^5$ .............................................. G01B 11/24
[52] U.S. Cl. .................................................. 356/376
[58] Field of Search ...................... 356/371, 375–376, 356/124, 1, 4

[56] References Cited

U.S. PATENT DOCUMENTS 2,446,628  9/1987  Brown .................................. 356/371
4,929,846  10/1988  Mansour ............................. 356/371

FOREIGN PATENT DOCUMENTS 2851750  3/1980  Fed. Rep. of Germany ...... 356/371

OTHER PUBLICATIONS

Takacs et al., "Surface Topography Measurements Over One Meter to Ten Micrometer Spacial Period Bandwidth", SPIE, vol. 1164, Surface Characterization and Testing 11, 1989, pp. 203–211.
Von Bieren, "Pencil Beam Interferometer for Aspherical Optical Surfaces", SPIE, vol. 343, Laser Diagnostics, 1982, pp. 101–108.

Primary Examiner—F. L. Evans
Assistant Examiner—K. P. Hantis
Attorney, Agent, or Firm—Longacre & White

[57] ABSTRACT

Measurement of curvature and profile of a reflective test surface by simultaneous measurement of slope at two closely spaced points on the test surface. A pair of parallel, nearly collimated light beams, which are slightly displaced relative to each other and of opposite linear polarization, and which intersect the test surface are reflected by the test surface, separated by a polarizing beam splitter and focused onto individual position sensitive detectors, which sense the slopes of the test surface at the points where it is intersected by the beams. The difference between the measured slopes is proportional to the local curvature. The device can be scanned along the surface to give a profile of measured curvature values, which are twice integrated to give the surface profile, although measurement at a single point without any such processing yields the test piece curvature. The device is reconfigured to test surfaces with different curvatures by virtue of one of the detectors being movable during initial alignment, and by virtue of a steering mirror and associated servo control system which maintain an essentially constant angle of incidence on the test surface.

33 Claims, 4 Drawing Sheets

METHOD AND DEVICE FOR NONCONTACTING SELF-REFERENCING MEASUREMENT OF SURFACE CURVATURE AND PROFILE

BACKGROUND OF THE INVENTION

The present invention relates to methods and apparatus for the measurement of the curvature and profile of a surface. More particularly, the invention relates to noncontacting, self-referencing, electro-optical methods and apparatus for this type of measurement which are capable of accurately measuring reflecting surfaces, having various curvatures, which may be moving or vibrating before or during the measurement.

THE PRIOR ART

Testing of easily damaged surfaces requires a noncontacting measurement device. Testing of precise surfaces requires correspondingly accurate measurements. For example, surfaces used in optics and semiconductor application often have surface quality requirements on the order of several Angstroms, and measurement requirements on the order of an Angstrom, for surface errors with typical lateral dimensions of several millimeters.

Testing of plural surfaces whose individual curvatures vary widely requires corresponding reconfigurability of the measurement device and the independence of the device from reference surfaces whose profiles must be known even more accurately than the required measurement accuracies. In other words, self referencing operation is required.

Finally, testing of surfaces easily disturbed by the environment requires insensitivity of the measurement device to small movements and vibrations of the test surface relative to the device, before and especially during the measurement.

As will become apparent in the description of the preferred embodiments, the present invention measures both the curvature of a surface and its profile, by first measuring its curvature at plural locations. The prior art for curvature measurement and profile measurement are therefore discussed separately below.

THE PRIOR ART FOR CURVATURE MEASUREMENT

Prior-art curvature measuring methods and devices which fulfilled the noncontacting requirement also failed to meet one or more of the remaining requirements. Such methods and devices can be divided into nonoptical and optical groups.

Essentially the only device in the nonoptical group is the capacitance sensor, which uses the curved test surface and a metallic reference surface as capacitor plates. The capacitance of this capacitor varies with the curvature of the test surface. This method, however, has very limited accuracy, cannot be adapted to testing very small regions on the test surface, and requires that the reflecting surface be conductive and that it be electrically accessible. Furthermore, such a device is inherently sensitive to movements and vibrations of the test surface relative to the reference surface, since such movements and vibrations would change the capacitance of the capacitor.

Methods and devices in the optical group include several which are well adapted for measuring the refractive power of a human eye, but which are far too inaccurate for use in testing the high precision surfaces encountered in optics and semiconductor applications. An example of such a device is disclosed in Nohda U.S. Pat. No. 4,787,743 issued Nov. 29, 1988.

A much more pertinent example of a device in the optical group is disclosed in Bellio U.S. Pat. No. 4,735,508 issued Apr. 5, 1988. This device uses two separate laser beams which are projected onto the test surface and then reflected to a viewing screen. The separation between the reflected spots (as measured by a viewing camera) is a measure of the test surface curvature. This device is noncontacting and self-referencing. However, it fails to meet the other requirements, as follows: (1) its quoted accuracy is approximately 100,000 times worse than required for testing the high precision surfaces in optics and semiconductor applications; (2) it is not reconfigurable for testing plural surfaces whose individual curvatures vary widely; and (3) because out-of-plane movements and vibrations of the test surface directly affect the separation between the reflected spots, the device is inherently sensitive to such movements and vibrations.

A final example from the optical group is the classical knife edge test. A form of this device is disclosed in Kuppenhenheimer U.S. Pat. No. 4,402,602 issued Sept. 6, 1983. As with all knife edges devices, however, this device is tedious to use, has very limited accuracy, and is quite sensitive to movements and vibrations of the test surface.

THE PRIOR ART FOR PROFILE MEASUREMENT

Prior-art profile measuring methods and devices which fulfilled the noncontacting requirement have also failed to meet one or more of the remaining requirements. Such methods and devices can again be divided into nonoptical and optical groups. Accurate devices in the nonoptical group include eddy-current sensors, capacitance sensors, and more recently, quantum tunneling sensors. These devices are essentially proximity sensors which must be mechanically scanned along a line whose straightness or shape is known by means of an accurate reference surface. Thus, although nonoptical devices can have high accuracy, they inherently fail to meet the self-referencing requirements. By virtue of their measuring relative height between the test surface and the reference surface, they are also inherently sensitive to movements and vibration of the test surface relative to the reference surface.

Optical devices offer a possibility of noncontacting, self-referencing operation, and can be divided into the following groups: interferometric height measuring devices; noninterferometric height measuring devices; interferometric slope measuring devices; and noninterferometric slope measuring devices.

Interferometric height measuring devices compare the profile of the test surface with that of a calibrated reference surface, and thus fail to meet strictly the self-referencing requirement. In practice, though, the optical reference surface may be so accurate, or at least so stable and therefore calibratable, that the failure to meet the self referencing requirement is of little practical consequence. None-the-less, by virtue of their measuring relative height between the test surface and the reference surface, these devices are also inherently sensitive to movements and vibrations of the test surface relative to the reference surface. Moreover, interferometric height measuring devices typically require separate reference surfaces for measuring test surfaces with different curvatures, although some modern commercial instruments such as those by the Zygo Corporation of Middlefield, Conn., and the Wyko Corporation of Tucson, Ariz. can test spherical surfaces with a wide range of curvatures without reconfiguration.

Several recent interferometric height measuring devices which are useful and which have various innovative features, but which none-the-less suffer from the disadvantages discussed above, are those disclosed in McLaughlin U.S. Pat. No. 4,391,526 issued July 5, 1983; Eastman U.S. Pat. No. 4,422,764 issued Dec. 27, 1983; Downs U.S. Pat. No. 4,534,649 issued Aug. 13, 1985; Wyant et al. U.S. Pat. No. 4,639,139 issued Jan. 27, 1987; Sommargren et al U.S. Pat. No. 4,688,940 issued Aug. 25, 1987; Mori et al. U.S. Pat. No. 4,728,194 issued Mar. 1, 1988; Biegen U.S. Pat. No. 4,732,483 issued Mar. 22, 1988; and Bager U.S. Pat. No. 4,796,994 issued Jan. 10, 1989. Several of these devices are scanning devices which must relay on a mechanically certified reference surface, and therefore seriously fail to meet the self-referencing requirement. A novel approach to self-referencing is disclosed in Sommargren U.S. Pat. No. 4,353,650 issued Oct. 12, 1982. There, the reference surface is but a single point on the test surface located at the center of a circle which is the scanning path on the test surface. Although this makes the instrument insensitive to movements and vibrations that do not affect the slope of the test surface, it provides no insensitivity to movements that alter the slope, and it leaves the instrument sensitive to minute wobbling of the rotation table carrying the test surface. The use of the rotation table also seriously limits the types of surfaces which can be accommodated.

Noninterferometric height measuring devices use a variety of techniques, most notably image blur sensing and projection of structured light. Moire fringe and related techniques are also used, but can be considered to lie within the more general category of structured light. The image blur sensing devices are essentially proximity sensors which must be mechanically scanned along a line whose straightness or shape is known by means of an accurate reference surface. Like the nonoptical devices, therefore, they inherently fail to meet the self-referencing requirement, and are inherently sensitive to movements and vibrations of the test surface relative to the reference surface.

Recent devices of the blur sensing type are those disclosed in Sawatari U.S. Pat. No. 4,017,188 issued Apr. 12, 1977 and Murata U.S. Pat. No. 4,115,005 issued Sept. 19, 1978. Structured light and Moire fringe approaches are useful because of their reconfigurability and their implicit use of optical reference surfaces which can be accurately calibrated. However, their accuracy is limited, and they are inherently sensitive to movements and vibrations of the test surface relative to the reference surface. A recent device of this type is disclosed in MaKosch U.S. Pat. No. 4,714,348 issued Dec. 22, 1987.

Interferometric slope measuring devices give the profile of a surface indirectly by integrating the measured first derivative, or slope, of the surface. Such devices include all types of shearing interferometers as well as newer devices that project a pair of displaced laser beams onto the test surface. The lack of directness in such devices is made up for by their differential nature - they measure slope by interferometrically comparing the surface height at one location with that at a neighboring location. Thus the test surface is its own reference surface, making the measurement device both self-referencing and inherently insensitive to movements and vibration that do not affect the slope of the test surface, although such devices are still sensitive to test surface movements that alter the slope.

Classical shearing interferometer devices include those disclosed in Wu U.S. Pat. No. 4,660,978 issued Apr. 28, 1987 and Bareket U.S. Pat. No. 4,687,332 issued Aug. 18, 1987. As with all shearing interferometers, these devices are not easily reconfigurable for test surfaces with different curvatures.

Two-beam laser devices include those disclosed in Fujita U.S. Pat. No. 4,577,967 issued Mar. 25, 1986 and Fujita U.S. Pat. No. 4,650,330 issued Mar. 17, 1987. A similar and well developed commercial device is manufactured by Chapman Instruments, Inc. of Rochester, N.Y. This device is much more easily reconfigurable, but is still sensitive to test surface movements that alter the slope, and still has limited accuracy when compared to the Angstrom level requirements for test surface errors with typical lateral dimensions of several millimeters.

Noninterferometric slope measuring devices share the insensitivity to slope-preserving test surface motions discussed in connection with the interferometric slope measuring devices. They can also provide adequate accuracy. However, they measure slope directly rather than differentially, and thus do not share the self-referencing properties of the interferometric devices. They must rely on the stability of a laser beam direction as their reference. They also are seriously limited in the range of curvatures they can accommodate. Such devices include both autocollimators and scanning slope sensors. Examples are disclosed in Rosenfeld et el. U.S. Pat. No. 3,885,875 issued May 27, 1975 and Sato U.S. Pat. No. 4,332,477 issued June 1, 1982. Other examples are discussed in "Surface Topography Measurements over the 1 Meter to 10 Micrometer Spatial Period Bandwidth," P. Takacs et al., Proc. SPIE 1164 (1989), and "Pencil Beam Interferometer for Aspherical Optical Surfaces," K. von Bieren, Proc. SPIE 343, 101 (1982).

SUMMARY OF THE INVENTION

The principal object of the present invention is to provide a noncontacting, self-referencing electro-optical method and device capable of measuring the curvatures and profiles of reflective surfaces with improved accuracy. A further object is to provide for the testing of plural surfaces whose individual curvatures vary widely by providing suitable reconfigurability of the measurement device. A further object is to make the device insensitive to any small movements and vibrations of the test surface, before and especially during the measurement.

In fulfillment and implementation of the objects above, the method and device provide for the measurement of curvature and profile by differential measurement of slope. In curvature measuring the slope of the test surface is simultaneously measured at two locations, each individual slope measurement including reflecting of a narrow, nearly collimated beam of light by the test surface, and the focusing of the reflected beam onto a position sensitive detector. The curvature of the test piece is then proportional to the difference in the positions sensed on the detectors, divided by the relative displacement on the test surface between the beams of light. In the profile measuring method a series of curvature measurements are performed to obtain a curvature profile along a line. The profile is then obtained by twice integrating the curvature profile.

One device for implementing this method provides for a pair of parallel, nearly collimated light beams, which are slightly displaced relative to one another and of opposite linear polarization, and which intersect the test surface. Upon being reflected by the test surface, the beams are separated by a polarizing beam splitter and focused onto individual position sensitive detectors.

The position sensitive detectors, by virtue of lying at the focal point of a lens, sense the slopes of the two return beams, and therefore the slopes of the test surface at the points where it is intersected by the beams. The difference between the measured slopes is proportional to the local curvature. (The test surface is thus seen to be its own reference, making the device self-referencing.) The device and the test surface are translated with respect to each other and plural measurements are performed to give a profile of measured curvature values, which is then twice integrated to give the surface profile. Thus, the device measures curvature, and is inherently insensitive to movements and vibrations, including both slope-preserving and non-slope-preserving vibrations.

The device is easily reconfigured to test surfaces with different curvatures by means of two features. The first is a provision for displacing (and measuring the displacement of) one of the detectors before the scan is begun, in a direction perpendicular to the light beam hitting the detector, so that the detector's most sensitive and accurate area is intersected by the beam. This effectively adds a constant curvature to the measurement so that the range of curvatures most accurately sensed by the device coincides with the average curvature of the test surface. In short, this alignment matches the average curvature of the test surface. Since the alignment is performed once before the scan is begun, the accuracy in sensing curvatures during the scan is not degraded.

The second feature allows easy reconfiguration by virtue of a steering mirror to be placed in the path of the beams immediately before they strike the test surface. The mirror is steered according to the average signal from the two detectors. The steering mirror thus adds a equal slope component to both beams so that they strike their respective detectors in their most sensitive and accurate area. (Put another way, the mirror is steered to maintain an essentially constant incidence angle on the test surface.) Since the measured curvature is proportional to the difference in slope signals, the steering mirror has no effect on the measured curvature - it only maintains the accuracy of the signals. Just as importantly, it compensates for the local average slope of the test surface. Therefore, a very wide range of slopes can be accommodated, as can a large amplitude of non-slope-preserving vibrations.

As the mathematical definition of curvature is 1/r where r=radius of curvature, this device can be used to measure the radius of curvature of a reflective test surface.

The features and advantages of the present invention will become apparent from the following detailed description of the invention when read with the accompanying drawings, wherein like parts have been given like numbers.

DESCRIPTION OF THE PREFERRED EMBODIMENTS

Figure 1:
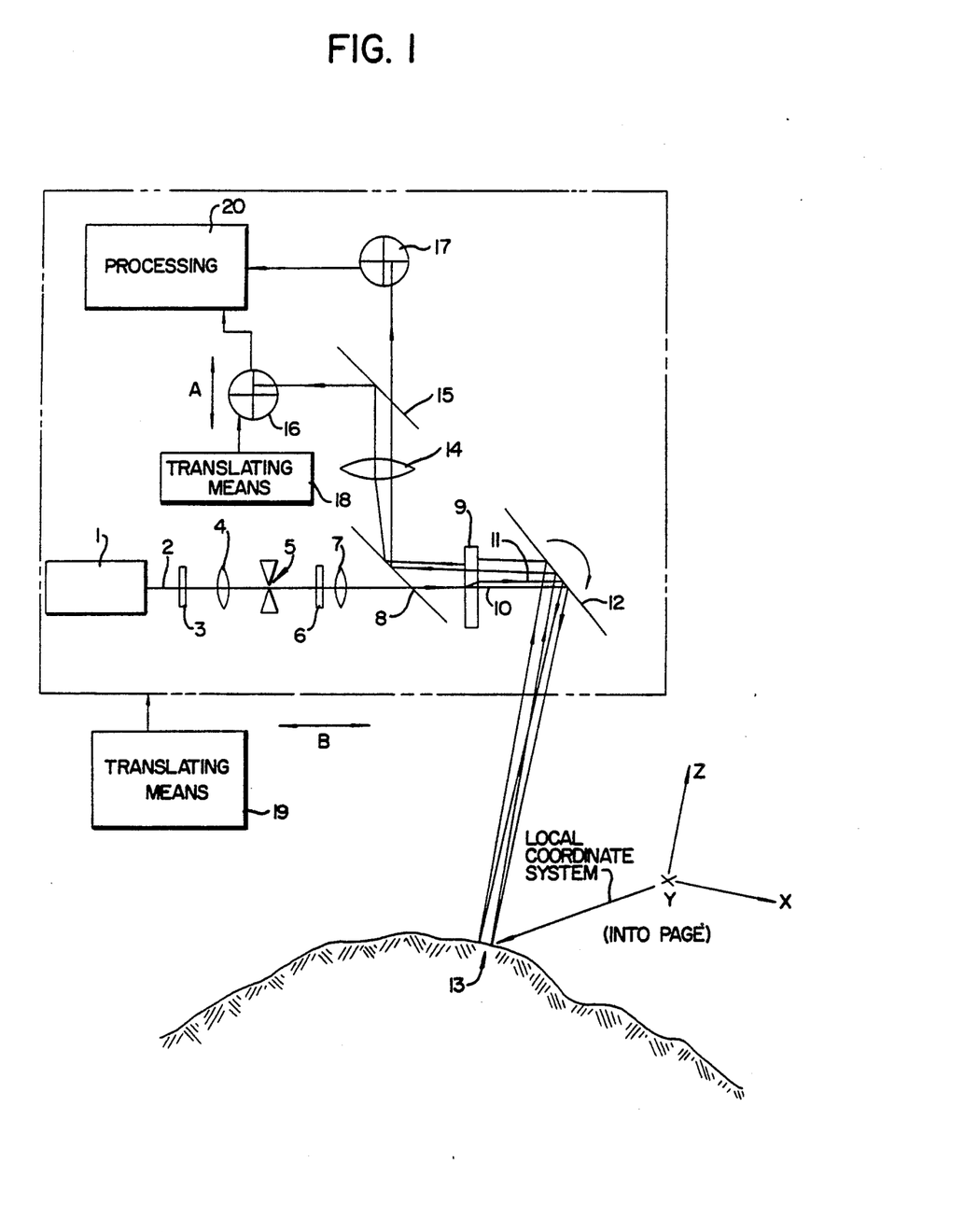
FIG. 1 is a schematic of a preferred embodiment of the optical layout of the present invention.

Refer now to FIG. 1, which is a schematic of a preferred embodiment of the optical layout of the present invention.

A light source 1 such as an incandescent bulb, xenon bulb, light-emitting diode, laser diode, or other source of electromagnetic radiation, and most preferably a gas laser, provides optical energy for the narrow, nearly collimated, linearly polarized light beam 2. The direction of polarization is arranged to be at an angle of 45 degrees relative to an axis in the plane of FIG. 1 and perpendicular to beam 2. (In fact, any arbitrary elliptical polarization state, including linear and circular, which is symmetric about this 45 degree axis is permissible. The linear state described is the simplest, and is therefore preferred.) Beam 2 travels through modulator 3, which modulates the intensity of beam 2 in a rapid, periodic manner so that the detection to be described can be performed in the standard synchronous manner for maximum rejection of stray light and maximum signal-to-noise ratio. A preferred implementation for modulator 3 is an acousto-optic crystal modulator matched to the wavelength of light source 1.

Beam 2 travels through lens 4, which focuses the nearly collimated beam onto pinhole 5. Pinhole 5 serves to clean up (i.e., to eliminate any residual, unwanted noncollimated portions of) beam 2. If beam 2 has a Gaussian profile, as it will if light source 1 is a gas laser, the pinhole diameter should be approximately twice the one-over-e-squared diameter of the focused beam. As will be described, pinhole 5 also serves to eliminate that portion of beam 2 eventually reflected by the test surface but not subsequently transmitted to the detectors. Finally, if modulator 3 is implemented as an acousto-optic crystal modulator, pinhole 5 serves to eliminate all diffracted orders except the desired first order.

After emerging from pinhole 5, beam 2 diverges and is recollimated by lenses 6 and 7. FIG. 1 shows lenses 6 and 7 as cylindrical collimating lenses of differing focal lengths, oriented at right angles to each other and to beam 2. The use of cylindrical collimating lenses of differing focal lengths provides for a recollimated beam having an elliptical profile. However, the principal of operation of the measurement device is independent of the size and ellipticity of the collimated beam, whose major and minor diameters would typically be chosen to be somewhat smaller than half the lateral size of the smallest test surface features being studied. If a circular profile were desired for beam 2, then the cylindrical lenses 6 and 7 could clearly be implemented as a single spherical lens.

After emerging from lenses 6 and 7, a portion of beam 2 travels through nonpolarizing beam splitter 8. In order to maximize total energy throughput, the optimum transmission of nonpolarizing beam spitter 8 is 50%. The energy reflected by nonpolarizing beam splitter 8 on this first pass through is lost.

After emerging from nonpolarizing beam splitter 8, beam 2 travels through beam shearing device 9, forming the two beams 10 and 11. A preferred implementation for beam shearing device 9 is a plane parallel calcite plate whose axis is either in the plane of FIG. 1 or perpendicular to it. Used in this manner, a calcite plate shears the polarization component of the incident beam in the plane of the calcite axis relative to the perpendicular polarization component by a distance of approximately (d tan (6 degrees)) for light with a wavelength of 6,328 Angstroms, where d is the thickness of the calcite plate. Typical operation of the measurement device would call for a beam separation of approximately one-sixth to one-half of the beam's diameter before separation, which would suffice to define the calcite plate thickness d for this example.

After emerging from beam shearing device 9, beams 10 and 11 (which are now linearly polarized at a relative angle of 90 degrees to each other) are reflected by steering mirror 12 and strike test surface 13. The steering mirror is aligned so that the beams strike test surface 13 slightly off of normal incidence. Note that strict normal incidence would minimize the required size of steering mirror 12, nonpolarizing beam splitter 8, and beam shearing device 9, and would maintain the most constant possible intersection locations between the test-surface-reflected beams and all subsequent surfaces, thus minimizing associated measurement errors. Nonetheless, a slight deviation from normal incidence changes these desirable properties only slightly, while adding the desirable property that light which is reflected by the test surface but not subsequently transmitted to the detectors will be eliminated at pinhole 5, rather than being passed on to light source 1 where it could interfere with said light source's operation.

After beams 10 and 11 are reflected from test surface 13, their general directions are defined by the general slope of the test surface. However, the beams are given small individual changes in direction corresponding to the small local slopes at the intersection points of the beams with the test surface. As will be made apparent, it is the difference between the beams' slopes that is measured and that defines the local curvature of the test surface.

After being reflected by test surface 13, beams 10 and 11 are reflected a second time by steering mirror 12 before traveling a second time through beam shearing device 9. After emerging from the beam shearing device, the beams would recombine into a single beam if the test surface were perfectly flat and smooth. However, because of the small slope change imparted to each beam as discussed above, the beams will in general not be entirely coincident after emerging from beam shearing device 9.

After emerging from beam shearing device 9, beams 10 and 11 travel a second time through nonpolarizing beam splitter 8. The energy transmitted by nonpolarizing beam splitter 8 on this second pass through is lost. (As previously discussed, because of the slightly non-normal incidence at the test surface, this energy will be rejected by pinhole 5 with the result that it cannot interfere with light source 1.)

After being reflected by nonpolarizing beam splitter 8, beams 10 and 11 travel through lens 14 and proceed to polarizing beam splitter 15, which transmits the p-polarization beam and reflects the s-polarization beam.

(The p component is the polarization component in the plane defined by the incident beam and the normal to the beam splitting surface. The s-component is the polarization component perpendicular to the plane defined by the incident beam and the normal to the beam splitting surface. The principal of operation of the measurement device is independent of which beam is chosen to have each polarization, which is determined simply by whether the axis orientation of beam shearing device 9 is in the plane of FIG. 1 or perpendicular to it.)

After being respectively reflected and transmitted by polarizing beam splitter 15, beams 10 and 11 strike position sensitive detectors 16 and 17, which lie at the focal point (or its image through polarizing beam splitter 15) of lens 14. The focal length of lens 14 and the sizes of position sensitive detectors 16 and 17 are typically chosen so that the focused spots are on the order of half the size of the detectors. The spot sizes are calculated using standard diffraction techniques, taking into account the wavelength, size, and profile of the beams as they enter the lens.

Position sensitive detectors 16 and 17, by virtue of lying at the focal point of lens 14, sense the slopes of beams 10 and 11, and therefore the slopes of the test surface at the points where it is intersected by the beams. As will be seen, detectors 16 and 17 are sensitive to slope both along the direction of relative beam displacement on the surface, and across the direction. However, it is the difference in slopes in the direction of relative beam displacement that determines the test surface curvature.

In order to accommodate test pieces with different average radii of curvature, position sensitive detector 16 is translated in the plane perpendicular to the beam incident on it. We begin by assuming that the steering mirror 12 is always pointed so that the beam incident on position sensitive detector 17 strikes it at its center, where it is most sensitive and accurate. In that case, the effect of measuring test pieces with different average radii of curvature will be to change the location of the beam incident on position sensitive detector 16. Therefore, by displacing (and measuring the displacement of) detector 16 before the test measurement is performed, one can cause the beam incident on detector 16 to strike it at its center. This can be accomplished by providing means schematically indicated as 18 including motor and translation stage to translate detector 16 in the direction indicated by the arrows A. In short, by displacing (and measuring the displacement of) position sensitive detector 16 during initial alignment of the measurement device, one can accommodate test pieces with different average radii of curvature while still operating both position sensitive detectors in their most sensitive and accurate regions.

Before defining how the curvature is determined, it should be noted that the definition of curvature requires a coordinate system, an example of which is shown in FIG. 1 as a local coordinate system which is part of test surface 13. As shown, the x direction is along the nominal test surface in the direction of relative beam displacement, the y direction is along the nominal test surface but perpendicular to the direction of relative beam displacement, and the z direction is along the local outer normal to the nominal test surface. (The nominal test surface means the test surface as it would be without the small profile errors which are to be measured.) In this local coordinate system, the relevant curvature is defined by $$C = [d^2 z_{surface}/ dx^2] / [1 + (dz_{surface} / dx)^2]^{3/2} \quad (1)$$

where C is the curvature, $z_{surface}$ is the test surface z coordinate as a function of x, the notation $(d^2 / dx^2)$ denotes a second derivative with respect to x, and the notation $(d / dx)$ denotes a first derivative.

The sensed positions on detectors 16 and 17 can be used to give the curvature C as follows:

$$C = (x_{detector\text{-}lead} - x_{detector\text{-}lag}) / (2 \, f \, s) \quad (2)$$

where $x_{detector\text{-}lead}$ = position sensed on the detector corresponding the leading beam on the test surface (i.e., the beam with the larger x coordinate), in the detector direction corresponding to surface slope $(dz_{surface} / dx)$. (In the example of FIG. 1, the leading beam is 10, and the corresponding detector is detector 17.) The sign convention is that a positive test surface slope $(dz_{surface} / dx)$ at the leading beam gives a positive sensed detector position $x_{detector\text{-}lead}$.

$x_{detector\text{-}lag}$ = position sensed on the detector corresponding to the lagging beam on the test surface (i.e., the beam with the smaller x coordinate), in the detector direction corresponding to surface slope $(dz_{surface} / dx)$. (In the example of FIG. 1, the lagging beam is beam 11, and the corresponding detector is detector 16.) The sign convention is the same as above.

f = focal length of lens 14 and
s = separation between beams 10 and 11 at and along test surface 13

In order to obtain a profile of the test surface, the measurement device and the test surface are translated with respect to each other, in the same direction in which beams 10 and 11 are displaced with respect to each other. This can be accomplished by providing means schematically indicated as 19 including motor and translation stage to translate the entire measurement device 18 in the direction indicated by the arrows B.

This translation could be accomplished by translating only a portion of the measurement device, including at the very least mirror 12. However, since the distance from mirror 12 to light source 1 would thereby change, this approach could degrade the measurement by changing the size and divergence of beams 10 and 11 at test surface 13. Similarly, the profile can be obtained by providing means to translate test surface 13 in the direction indicated by arrows B. (As used here, the translation of test surface 13 includes but is not limited to linear translation, and rotation about the test surface's center of curvature.) In either translation approach, a series or profile of measured curvature values is obtained in the direction of the translation. As will be discussed below in connection with FIG. 4, the curvature values are twice integrated by a suitable processing circuit or the like 20 with respect to the distance along the surface in the direction of translation, to give the desired surface profile.

Figure 2:
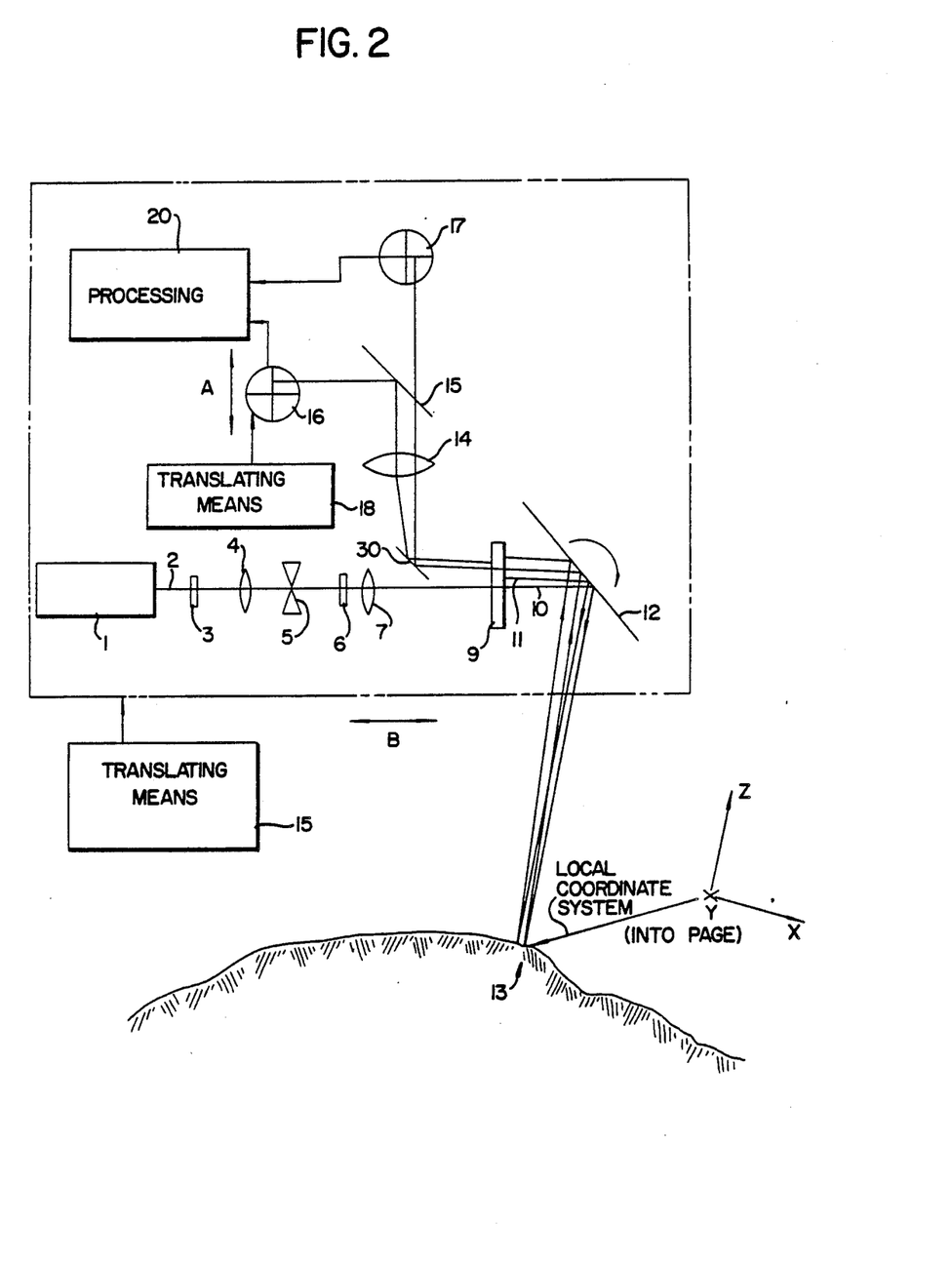
FIG. 2 is a schematic of an alternate embodiment of the optical layout of the present invention.

Refer now to FIG. 2, which is a schematic of an alternate embodiment of the optical layout of the present invention.

FIG. 2 shows one of many ways in which the optical layout could be modified. In particular, nonpolarizing beam splitter 8 from FIG. 1 has been replaced by pickoff mirror 30. This substitution can be made if the measurement device is operated in a sufficiently non-normal incidence mode at the test surface so that beams 10 and 11 are completely clear of beam 2 at pickoff mirror 30 after being reflected by test surface 13. The advantage of the attendant four-fold increase in optical energy reaching detectors 16 and 17 would have to be balanced against the disadvantages of the more non-normal incidence mode and the more difficult initial alignment caused by the pickoff mirror's limited size.

Figure 3:
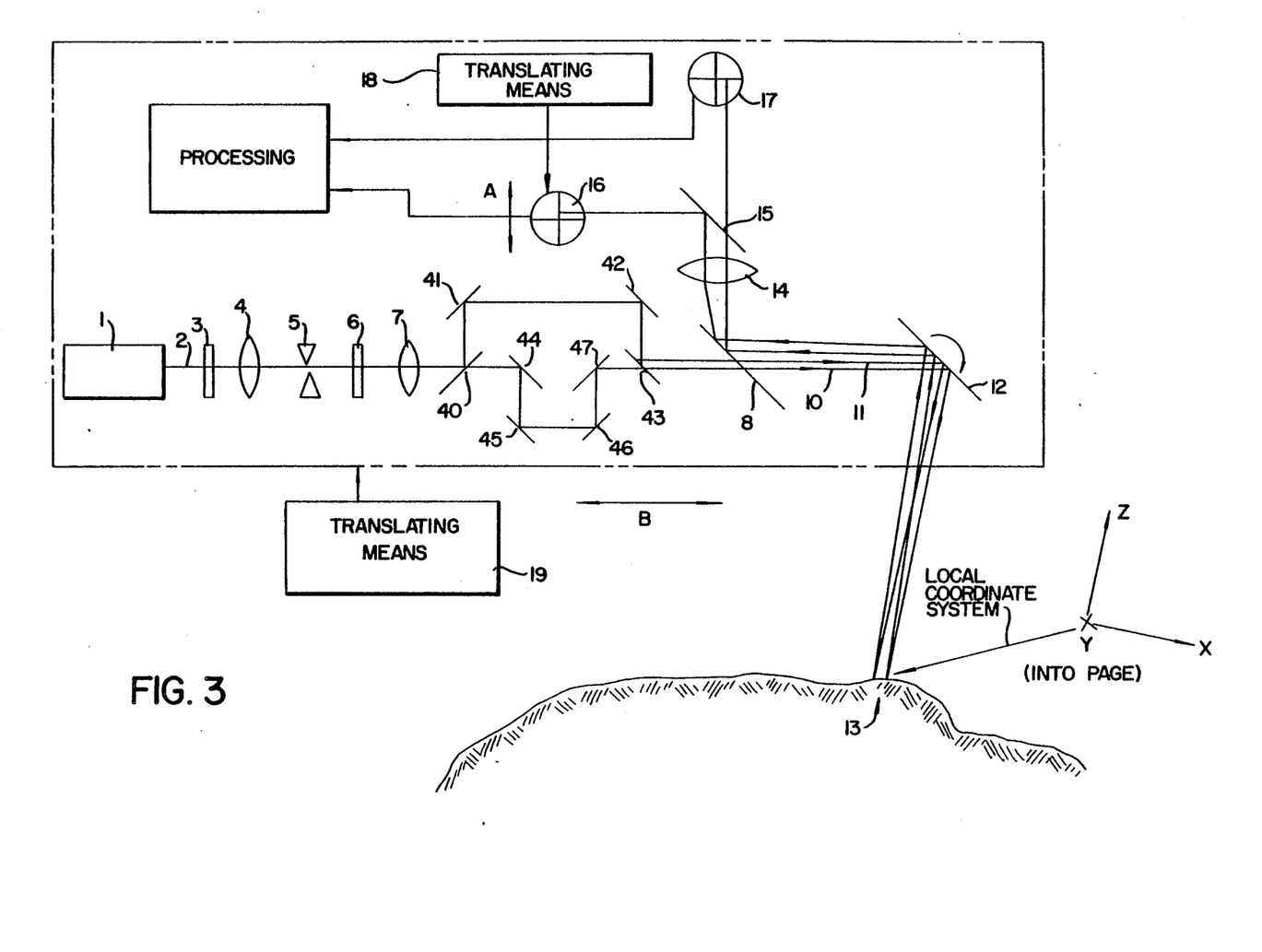
FIG. 3 is a schematic of a second alternate embodiment of the optical layout of the present invention.

Refer now to FIG. 3, which is a schematic of a second alternate embodiment of the optical layout of the present invention.

FIG. 3 shows another way in which the optical layout could be modified. In particular, beam shearing device 9 has been replaced by polarizing beam splitters 40 and 43 and mirrors 41, 42, 44, 45, 46 and 47. The polarizing beam splitters and mirrors are arranged to shear one polarization component with respect to the other while maintaining equal path lengths for the two polarizations. The polarizing beam splitters work identically to polarizing beam splitter 15 discussed in connection with FIG. 1. This arrangement can be made easily adjustable, in contrast to beam shearing device 9. The advantage of adjustability must be balanced against the disadvantages of the lessened stability in relative direction of the two exiting beams, and the lengthened path over which the return beams are no longer essentially coincident.

FIG. 3 shows yet another way in which the optical layout could be modified, in that it shows the order of nonpolarizing beam splitter 8 and the beam shearing device being reversed. There are many such possible modifications, including but not limited to (1) reversing the order of transmission and reflection through nonpolarizing beam splitter 8; and (2) reversing the order of polarizing beam splitter 15 and lens 11 (which would then naturally need to become a pair of similar lenses).

Figure 4:
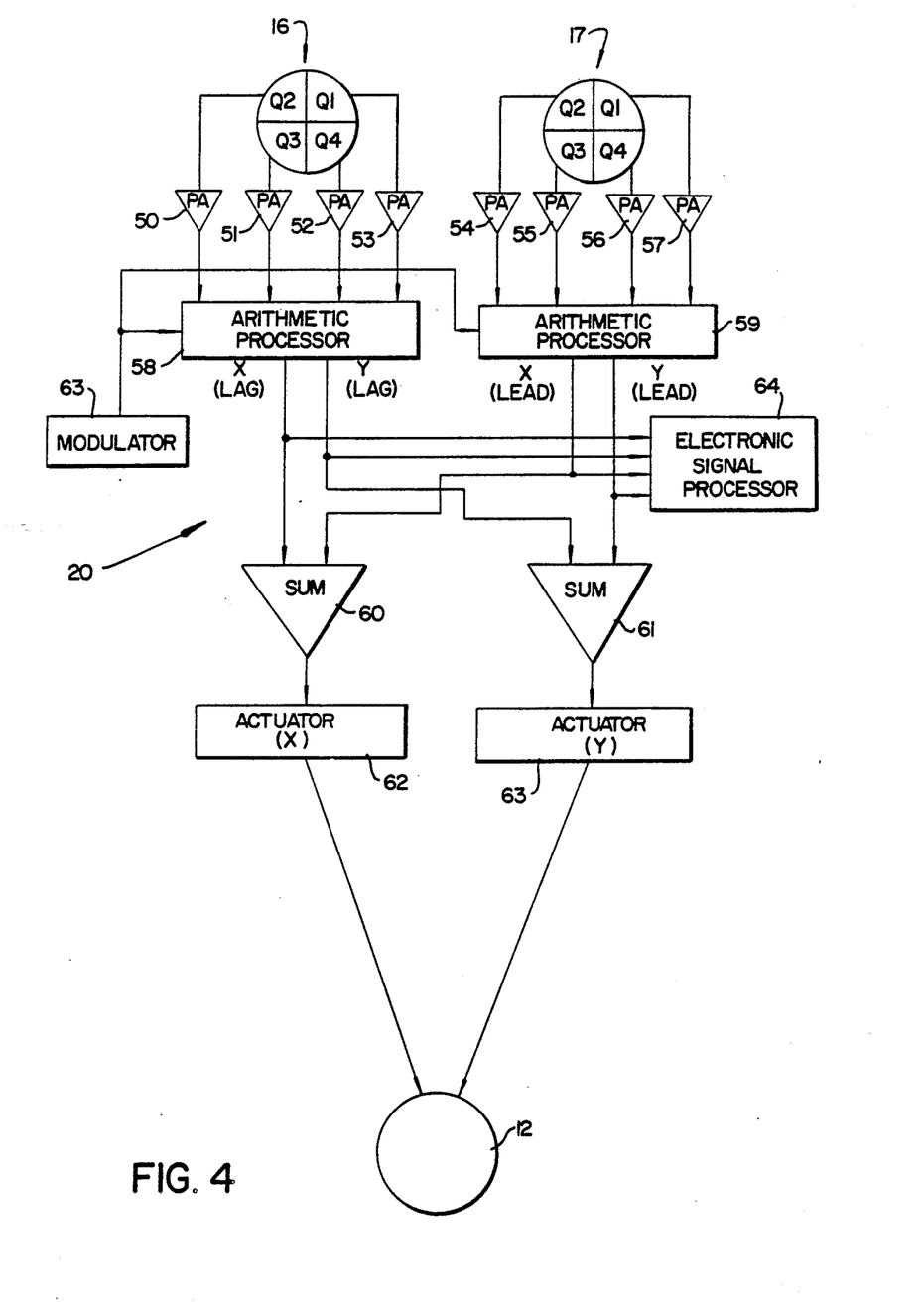
FIG. 4 is a block diagram of a preferred embodiment of the electronic circuitry of the present invention.

Refer now to FIG. 4, which is a block diagram of a preferred embodiment of the electronic processing circuitry 20 of the present invention.

In the embodiment in FIG. 4, position sensitive detectors 16 and 17 are silicon quadrant cell detectors. Such detectors, typified by the Silicon Detector Corporation SD380-23-21-051, are readily available and are characterized by high sensitivity, accuracy, and linearity when the spot whose position is being sensed is near the center of the detector. The left-right position on such a detector is derivable from the arithmetically processed signal $$S = (R - L) / (R + L) \quad (3)$$

where
S = arithmetically processed signal output
R = output voltage or current signal from the right half of the detector
L = output voltage or current signal from the left half of the detector As a particular example, if the spot has a Gaussian profile on the detector with one-over-e squared radius w, and if the spot is substantially smaller than the detector, and if the detector is assumed to be perfect with negligibly small insensitive zones between the quadrants, then the left-right position of the spot $x_{detector}$ is related to the signal S and the spot radius w (on the detector) through the expression $$x_{detector} = (w / 2^{\frac{1}{2}}) \, \mathrm{erf}^{-1}(S) \quad (4)$$

where erf$^{-1}$ is the standard inverse error function. Similar expressions naturally exist for spot position in the perpendicular direction.

Whatever the particular nature of the position sensitive detectors and the spots focused on them, expressions corresponding to Equation 4 are used to relate the detector signals to the positions of the focused spots on them.

The processing of position information by processing circuit 20 is shown schematically in FIG. 4, where the outputs of separate preamplifiers ("PA") 50-57 (one for each quadrant of each detector) are fed into arithmetic processors 58 (for detector 16) and 59 (for detector 17). Arithmetic processors 58 and 59 have outputs as defined in Equation 3. (Note that, for each detector, there is an output corresponding to test surface slope both in the x direction and in the y direction. The outputs are further described by whether they correspond to the leading or lagging beam on the test surface.) Assuming the light modulator previously discussed is used, the modulation signal of the modulator is used as shown as additional inputs to the arithmetic processors in order to implement synchronous detection in the standard manner.

The outputs of arithmetic processors 58 and 59 are used in two ways. In the first use, they are read by an electronic signal processor 64, a preferred embodiment of which is a computer with an analog-to-digital input device. The electronic signal processor 64 computes the curvature profile of test surface 13, as defined by Equations 2, 3, and 4. It then processes the curvature profile by twice integrating it, with respect to the distance along the surface in the direction of translation, to arrive at the desired profile of test surface 13. (Note that, according to Equations 2, 3, and 4 and the related discussion, the signal processor should not need the $y_{lead}$ and $y_{lag}$ signals, since only the x-curvature is being measured. However, in general, because of detector and electronic imperfections, small corrections to the inferred position in one direction may need to be made based on the signal in the other direction. The corrections would be made based on detailed calibrations of individual detectors and electronics.) Part of the profile information obtained from twice integrating the curvature profile is, naturally, the average curvature of the test surface. However, the average curvature can be sensed in as little as a single measurement, since the measurement device measures curvature directly. Therefore, the measurement device can be used as a curvature measurement device by measuring at only a single point and by deleting the twice integrating function from electronic signal processor 64.

In the second use of the outputs of arithmetic processors 58 and 59, they are summed by summing circuits 60 and 61, thereby giving outputs proportional to the average test surface slopes (in the x direction and y direction) at the points where the surface is intersected by beams 10 and 11. The outputs are used as inputs to actuators 62 and 63, which impart steering forces to steering mirror 12 (in the x and y directions respectively) according to the magnitude of the outputs. A preferred embodiment for the actuators is a pair of inductive ("voice coil") actuators, typified by the BEI LA12-12 moving coil linear actuator. Actuators 62 and 63, steering mirror 12, detectors 16 and 17, and the electronics discussed above thus form a closed loop servo system which maintains an essentially constant average incidence angle of beams 10 and 11 on test surface 13. By doing so, the servo system also maintains an essentially constant average location of the focused spots on detectors 16 and 17, thereby constantly using the detectors' most sensitive and accurate areas.

In summary, then, the present invention provides for the measurement of curvature and profile by differential measurement of slope. This is accomplished by providing for a pair of parallel, nearly collimated light beams, which are slightly displaced relative to each other and of opposite linear polarization, and which intersect the test surface. Upon being reflected by the test surface, the beams are separated by a polarizing beam splitter and focused onto individual position sensitive detectors, which sense the slopes of the test surface at the points where it is intersected by the beams.

The difference between the measured slopes is proportional to the local curvature. Because of the differential operation, the device is self-referencing and highly accurate. The device can be scanned along the surface to give a profile of measured curvature values, which are twice integrated to give the surface profile, although measurement at a single point without any such processing yields the test piece curvature. Since the device measures curvature, it is inherently insensitive to movements and vibrations of the test piece, including both slope-preserving and non-slope-preserving movements and vibrations. The device is easily reconfigured to test surfaces with different curvatures by virtue of one of the detectors being movable during initial alignment, and by virtue of a steering mirror and associated servo control system which maintain an essentially constant angle of incidence on the test surface. In short, the present invention fulfills the previously recited objects of providing a noncontacting, self-referencing electro-optical device capable of measuring the profiles of reflective surfaces with improved accuracy; of being suitably reconfigurable to test surfaces with varying curvatures; and of being insensitive to any small movements and vibrations of the test surface.

The foregoing description of the preferred embodiments of the invention has been presented for the purposes of illustration and description. It is not intended to be exhaustive or to limit the invention to the precise forms disclosed. Many modifications and variations are possible in light of the above teaching. it is intended that the scope of the invention be limited not by this detailed description, but rather by the claims appended hereto.

What is claimed:

1. An apparatus for measuring the curvature and profile of a test surface comprising:
    means for producing a pair of parallel light beams;
    means for directing said parallel light beams onto said test surface;
    means for separating reflections from said test surface of said parallel light beams into first and second separated reflected light beams;
    first and second individual position sensitive detectors; and
    means for focusing the first and the second separated reflected light beams on to the respective position sensitive detectors to produce output signals indicating curvature of said test surface, wherein a focal point of the means for focusing resides on each of said position sensitive detectors, such that the curvature of said test surface is determined irrespective of the alignment of said test surface.

2. An apparatus as in claim 1 wherein said beams producing means includes a source of a coherent radiation beam and means for shearing said coherent beam into said parallel light beams.

3. An apparatus as in claim 2 wherein said source for a coherent radiation beam includes means for producing a narrow, nearly collimated beam therefrom.

4. An apparatus as in claim 1 further including a steering mirror in the path of the beams before they strike the test surface and means for steering the mirror according to the average signal from the detectors.

5. An apparatus as in claim 1 wherein said means for directing includes a non-polarizing beam splitter for directing said parallel fight beams onto said test surface and directing said reflected light beams onto said focusing means.

6. An apparatus as in claim 1 including a pick-off mirror for directing the separated reflected light beams onto said focusing means.

7. An apparatus as in claim 1 wherein said detectors are silicon quadrant cell detectors.

8. An apparatus as in claim 1 further including means for processing said output signals to determine the curvature of said test surface.

9. An apparatus as in claim 8 wherein said processing means includes first and second arithmetic processors, an electric signal processor for reading the arithmetic processors, and means for summing the outputs of said arithmetic processors to produce an output proportional to an average of measured slope values as determined by the output signals of the position sensitive detectors.

10. An apparatus as in claim 9 wherein said directing means includes a steering mirror and actuators responsive to the output of said summing means for imparting steering forces to said steering mirror.

11. An apparatus as in claim 1 wherein said beams producing means includes means for producing a beam of coherent light and polarizing beam splitters and mirrors for shearing one polarization component of said coherent beam with respect to the other component while maintaining equal path lengths for the two polarizations.

12. An apparatus as in claim 1 further including means for obtaining a surface profile by obtaining a curvature profile comprising a series of measured curvature values and twice integrating said curvature profile.

13. An apparatus as in claim 1 including means for determining curvature by dividing the difference of position sensed by said detectors by the relative displacement on the test surface between the beams of light.

14. An apparatus as in claim 1, further including means for displacing and measuring the displacement of at least one of the detectors in a direction perpendicular to the light beam hitting said one detector so that the detector's most sensitive and accurate area is intersected by the beam, thereby accommodating test pieces with different average radii of curvature.

15. A device for measuring the radius of curvature of a reflective test surface irrespective of the alignment of said test surface, comprising:
a light source, and means to produce a narrow, nearly collimated light beam therefrom;
means of producing a pair of substantially identical, parallel, linearly and oppositely polarized light beams from said narrow beam;
means for projecting said parallel light beams onto said test surface wherein said parallel light beams are reflected from said test surface, forming reflections of said parallel light beams;
means for collecting at least a portion of the reflections of said parallel beams from said test surface, and separating said reflected light beams from one another, forming separated reflected light beams;
means for focusing said separated reflected light beams into focused spots on individual position sensitive detectors wherein a focal point of said means for focusing resides on each of said position sensitive detectors; and
means for processing the signals from said detectors to produce an output indicative of the curvature of said test surface, in the direction of the relative displacement between said parallel light beams.

16. A device of claim 15, further comprising a pinhole and associate focusing and collimating lenses arranged to:
(1) eliminate any residual, unwanted noncollimated portions of said nearly collimated beam; and
(2) prevent any portion of said reflections of said light beams from returning to said light source and interfering with its operation,
wherein said pinhole and said associated focusing and collimating lenses are located along the path of the collimated beam after the means to produce a narrow, nearly collimated beam and prior to the means of producing a pair of substantially identical, parallel, linearly and oppositely polarized beams from said narrow, nearly collimated beam.

17. The device of claim 15, further comprising a light modulator which modulates the intensity of said light source in a rapid, periodic manner so that the operation of said detectors can be performed in the standard synchronous manner for maximum rejection of stray light and maximum signal-to-noise ratio.

18. The device of claim 15, further comprising:
(1) a steering mirror which can change the angle of incidence of said parallel beams on said test surface;
(2) means for processing the signals from said detectors to produce outputs indicative of the average slopes, in both directions, of said test surface at the points where it intersects said parallel beams;
(3) means for imparting steering forces to said steering mirror according to the magnitudes of said outputs, thereby
(a) maintaining an essentially constant incidence angle, and
(b) maintaining an essentially constant average location of said focused spots on said detectors.

19. The device of claim 15 wherein the light source is a gas laser which produces a narrow, nearly collimated beam of linearly polarized light.

20. A device for measuring the profile of a reflective test surface, comprising:
(1) a light source, and means to produce a narrow, nearly collimated, linearly polarized light beam therefrom;
(2) means for producing a pair of substantially identical, parallel, linearly and oppositely polarized light beams from said light beam;
(3) means for projecting said parallel light beams onto said test surface wherein said parallel light beams are reflected from said test surface, forming reflections of said parallel light beams;
(4) means for collecting at least a portion of the reflections of said parallel light beams from said test surface, and separating said light beams from one another, therein forming separated reflected light beams;

(5) means for focusing said separated reflected light beams into focused spots on individual position sensitive detectors;

(6) means for processing signals from said detectors to produce an output indicative of the curvature of said test surface, in the direction of the relative displacement between said parallel light beams;

(7) means for imparting a series of relative translations between said test surface and said measuring device in the direction of relative displacement between said parallel light beams on said test surface, and for performing separate measurements at each translation position; and (8) means for processing said separate measurements by twice integrating them with respect to the distance along the surface in the direction of said relative translations to produce an output indicative of the profile of said test surface.

21. The device of claim 20, further comprising a pinhole and associated focusing and collimating lenses arranged to:

(1) eliminate any residual, unwanted noncollimated portions of said nearly collimated beam; and (2) prevent any portion of said reflections of said parallel light beams from returning to said light source and interfering with its operation.

22. The device of claim 20, further comprising a light modulator which modulates the intensity of said light source in a rapid, periodic manner so that the operation of said detectors can be performed in the standard synchronous manner for maximum rejection of stray light and maximum signal-to-noise ratio.

23. The device of claim 20, further comprising:

(1) a steering mirror which can change the angle of incidence of said parallel light beams on said test surface;

(2) means for processing signals from said detectors to produce outputs indicative of the average slopes, in both directions, of said test surface at the points where it intersects said parallel beams;

(3) means of imparting steering forces to said steering mirror according to the magnitudes of said outputs, thereby:

(a) maintaining an essentially constant average incidence angle; and (b) maintaining an essentially constant average location of said focused spots on said detectors.

24. The device of claim 20, wherein the light source is a gas laser which produces a narrow, nearly collimated beam of linearly polarized light.

25. A method of measuring the curvature and profile of a test surface comprising:

producing a pair of parallel light beams; .

directing said parallel light beams onto said test surface wherein said parallel light beams are reflected from said test surface, forming reflected light beams;

separating the reflections of said parallel light beams to form reflected separated light beams; and focusing the separated light beams into focussed spots on respective detectors to produce output signals indicating curvature of said test surface, wherein the separated beams are focused by a lens whose focal point resides on each of said position detectors, such that the curvature of said test surface is determined irrespective of the alignment of said test surface.

26. A method as in claim 25 wherein said beams producing includes producing a coherent radiation beam and shearing said coherent beam into said parallel light beams.

27. A method as in claim 25 wherein the step comprised of producing a pair of parallel light beams includes producing a pair of narrow, nearly collimated light beams.

28. A method as in claim 25 including the step of directing said reflections of said light beams with a pick-off mirror.

29. A method as in claim 25 including the step of steering the light beams before they strike the test surface according to an average of the output signals from the detectors.

30. A method as in claim 25 including the further step of processing the output signals to determine the curvature of the test surface.

31. A method as in claim 25 including the step of obtaining a surface profile from a series of curvature measurements.

32. A method for measuring the radius of curvature of a reflective test surface of a reflective test piece, comprising:

(1) simultaneously measuring the slope of said test surface at two locations, each individual slope measurement comprising:

(a) the projection of a narrow, nearly collimated beam of light onto said test surface wherein said beam of light is reflected from said test surface, forming a reflected light beam;

(b) the focusing by a focuser of the reflected light beam onto a position sensitive detector; and (c) deriving the test surface slope as one-half the position measured by said detector, divided by the focal length of said focuser;

(2) measuring the difference in the two said measured slopes, the corresponding direction on the test surface of said slopes being the same as the direction of relative displacement between said beams of light; and (3) deriving the curvature of said reflective test piece as said difference in measured slopes, divided by the relative displacement on said reflective test surface between said beams of light.

33. A method of measuring the profile of a reflective test surface of a reflective test piece, comprising:

(1) simultaneously measuring the slope of said test surface at two locations, each individual slope measurement comprising:

(a) the projection for a narrow, nearly collimated beam of light onto said test surface wherein said beam is reflected from said test surface, forming a reflected light beam;

(b) the focusing by a focuser of the reflected light beam onto a position sensitive detector; and (c) deriving the test surface slope as one-half the position measured by said detector, divided by the focal length of said focuser;

(2) measuring the difference in the two said measured slopes, the corresponding direction on the test surface of said slopes being the same as the direction of relative displacement between said beams of light;

(3) deriving the curvature of said reflective test piece as said difference in measured slopes, divided by the relative displacement on said reflective test surface between said beams of light;

(4) performing a series of said curvature measurements to obtain a curvature profile along a line on said reflective test piece in the same direction as the direction of relative displacement between said beams of light; and (5) deriving a surface profile by twice integrating with respect to the distance along the surface in the direction of said line of measurements.

* * * * *